May 10, 1955   J. D. LANGDON   2,707,969
VALVE CONSTRUCTION
Filed March 29, 1949
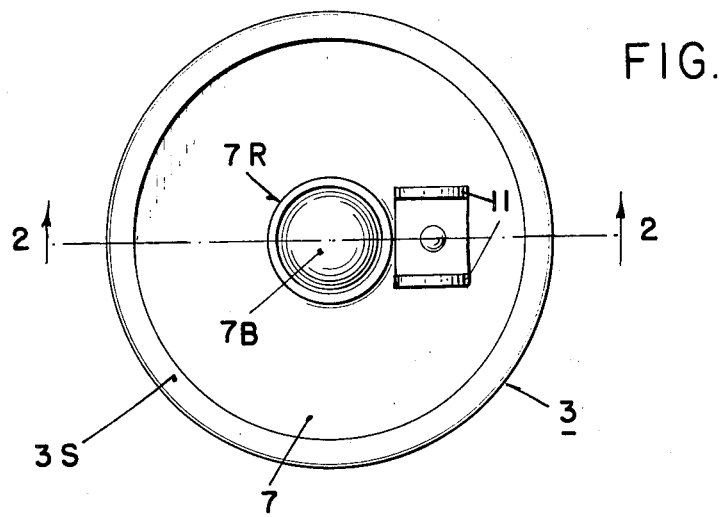
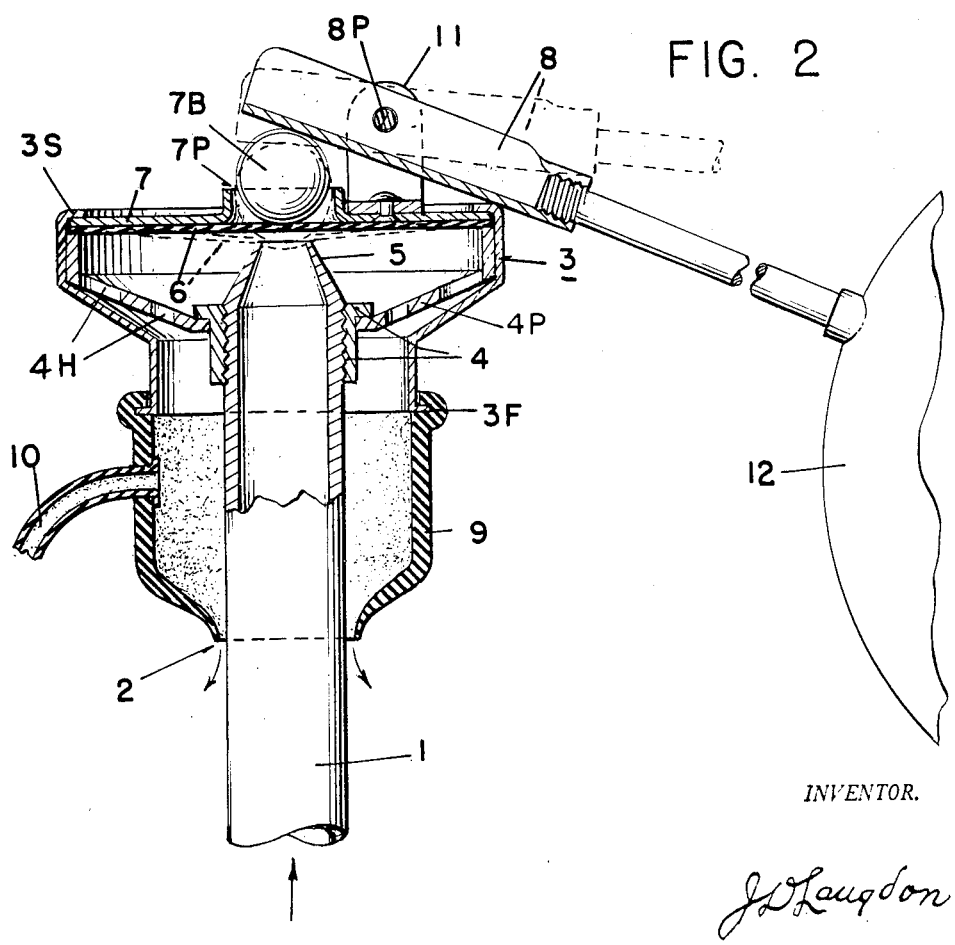
INVENTOR.
J. D. Langdon

United States Patent Office 2,707,969
Patented May 10, 1955

2,707,969

VALVE CONSTRUCTION

Jesse D. Langdon, Long Beach, Calif.

Application March 29, 1949, Serial No. 84,122

2 Claims. (Cl. 137—437)

This is a continuation, in part, of Ser. No. 566,653, filed December 5, 1944, now Patent No. 2,476,310 granted July 19, 1949.

The primary purpose of the invention aims to provide an improved form of structure to facilitate the manufacture and fabrication of the device set forth in the original patent application.

One purpose of the invention is to provide a flexible outlet extension in the form of a nipple adapted to form flexible attaching means for a refill tube, and at the same time provide an enlarged chamber for the accumulation of a body of liquid to silence the flow of the liquid thru the chamber.

A further object is to provide means for the convenient assembly of the various parts comprising the invention.

Another object is to provide a head for an operating lever in such a form that it may be conveniently stamped, formed and assembled.

Other and further objects and purposes will appear during the progress of this specification.

The form of reduction to practice illustrated by the drawing is for the purpose of illustration only, and may be changed within the scope of the claims.

Of the drawings:

Fig. 1 is a plan view looking from the top of the valve; operating lever 8 removed.

Fig. 2 is a median section of the valve assembly including fragmental portions of a tubular riser, float and rod attached thereto.

The reference characters designate the elements shown by the drawings as follows:

1—inlet supply tube or riser;
2—annular outlet;
3—valve body or casing;
3S—rim of casing spun inwardly;
3F—flared flange of casing outlet;
4—threaded supporting sleeve;
4P—perforated assembly plate or disc;
4H—holes through assembly disc;
5—conical valve seat;
6—diaphragm of flexible material;
7—assembly cap or disc;
7B—valve actuator ball;
7P—ball retaining perforation;
8—operating lever head;
8P—operating lever pivot;
9—nipple or funnel cylindrical member;
10—refill tube of relatively stiff bendable material;
11—fulcrum or actuating lever supports.

The elements comprising the construction of the valve together with the functions and operation thereof, include:

An inlet 1, formed by a supply tube or riser for supporting a valve head;

An annular outlet 2, formed between the riser 1 and the lower funneled end of a cylindrical member 9 preferably made of flexible material and having an internal groove recessed around the inner circumference of the upper inner end of the cylindrical member 9;

A casing 3 formed cylindrical at the top and having a funneled lower end flared at the bottom to form a flange 3F which is encompassed by the internal groove of the nipple 9; the flange supporting the nipple 9 in operative position. The casing as at 3S is provided with an extension which is spun inwardly to form a retaining flange to maintain the valve head assembly in a unit.

A flanged and internally threaded sleeve 4 is press fitted and secured thru the center of a perforated disc 4P which has ports or holes 4H therethru, the peripheral portion of the disc 4P being configurated to form a rim for supporting a flexible diaphragm valve member 6 and a cap formed by a disc 7. The riser 1 is adjustably inserted into the sleeve 4 and supports the entire valve assembly.

A coniform valve seat 5 is formed by spinning or otherwise shaping the upper end of the tubular riser 1 and forms a substantially sharp valve seat for the diaphragm 6. The apex of the seat is spun smoothly so as to embed in the diaphragm 6 without cutting the latter.

The diaphragm 6 is made of flexible material capable of permitting the seat 5 to be embedded therein.

A cap 7 is formed by a substantially flat disc having an upturned rim 7P surrounding a perforation 7P adapted to retain a ball 7B inserted in the perforation beneath the actuator lever 8, whereby the diaphragm actuating ball 7B is retained in operative position.

The operating lever 8 is held in position by a pivot 8P inserted thru the two upright ears of the fulcrum support 11 and the lever 8.

The cylindrical funneled member or nipple 9 is preferably made of flexible rubber-like material and has a cylindrical form with a funneled lower end which normally slightly clears riser 1 and circumscribes outlet 2. The cylindrical portion surrounding a relatively large annular chamber formed between the wall of the riser 1 and the cylindrical portion of the nipple 9. The nipple 9 normally retains a body of liquid after the valve is closed due to the fact that no atmospheric or other pressure can enter the nipple 9 above the outlet 2 to permit liquid to be evacuated therefrom. The upper rim of the nipple 9 is preferably reinforced externally by a thickened bead to provide the necessary tension to hold the same in operative position.

A refiller tube 10 made of relatively stiff material adapted to be bent which is flexibly attached to the valve structure by means of the nipple 9 and is flanged at one end and inserted outwardly from the inside of the wall of nipple 9. This flexible connection prevents the refiller from being broken off when it is necessary to bend the same so that the end will enter an overflow standpipe ordinarily provided in a toilet flushing tank. The ordinary refill tube is usually attached rigidly to a metal valve head or threaded into a head and frequently kinks or breaks off at the point of attachment. This fault is obviated by the flexible attachment provided by this invention.

A fulcrum portion 11 is formed with two ears straddling the operating lever 8 held in position by the pivot 8P. The fulcrum 11 is shown made of a stamping held in position by a single rivet thru the disc 7. The base of the fulcrum is placed tightly against the rim 7P which limits the rotation of the fulcrum in case the rivet becomes loosened, the lever 8 will remain in operative position to actuate the ball 7B which serves as an intermediate valve actuator between the lever 8 and the diaphragm 6. It will be noted that the space between the top of the rim 7P and the bottom of the lever 8 is at all times limited by the lever resting on the inturned flange 3S. This prevents the lever 8 from being depressed beyond its fixed position by the weight of the lever and float 12 when the water level in a tank falls below the predetermined level of the float 12. The lever at all times acts to hold the ball 7B in operative position due to the spacing maintained by the contact of the lever 8 against the casing at 3S. At the same time the float attached to the lever 8 is held in a position high enough in the tank to require the water to rise to a level predetermined by the position of the lever 8 before the valve is closed at which time the valve is quickly closed with only a short movement of the float 12, thus eliminating a prolonged closing of the valve and permitting the valve to remain wide open for the quick filling of the tank.

The essence of the invention lies in the configuration of the relative parts whereby each of the parts may be conveniently made of a stamping and the combination with the device of a flexibly connected refill tube.

Having described the invention and the improvements embodied therein as applied to the original application Ser. No. 566,653, now Patent No. 2,476,310, it is presented that the operation of the instant invention is substantially the same as that described in the parent application.

I claim:

1. A valve construction combination comprising a tubular riser for connection to a pressure fluid supply source and forming inlet means including a valve seat, an assembly plate surrounding said inlet means and supported therefrom, said assembly plate perforated to communicate between the inlet and an annular outlet opening surrounded by an outer shell at one end mounted in circumscribing position about said plate and having an outlet end spaced from and about the riser for providing the outlet, a diaphragm of deformable material supported by an upwardly projecting outer rim portion provided on said assembly plate spacing said diaphragm upwardly away from said plate and forming an annular chamber about the seat formed by the inner end of said riser, a cap resting against said diaphragm, the upper end of said outer shell surrounding, extended above and crimped radially inwardly to form a flange extended over the periphery and outer face of said cap, said diaphragm and assembly plate being embraced between said flange and a portion of said outer shell projecting radially inwardly beneath and impinging the outer peripheral area of the lower face of said assembly plate said shell converging toward said tubular riser and terminating in an outwardly flared flange inserted into a groove formed circumferentially internally of the upper end of a nipple made of deformable material, a relatively large annular chamber encompassed within the confines of said nipple, the lower end wall of said nipple extended radially inward and forming baffle means to retard liquid flow thru the restricted annular outlet opening formed between the terminus of the nipple and said riser, whereby a relatively large liquid body is retained in said chamber during and silencing liquid flow therethru.

2. A valve construction including an inlet tube, a disc shaped assembly member mounted on the tube, an inlet port and valve seat formed by said inlet tube and projecting thru said assembly member a shell forming an outlet member formed with an inwardly projecting annular shoulder disposed beneath, against and supporting said assembly member and forming a floor surrounding an annular outlet port between said inlet tube and said floor, a diaphragm of deformable material supported by said assembly member, a disc shaped cap surmounting said diaphragm, said shell extended upwardly about said assembly plate, diaphragm and cap and being crimped inwardly over the outer periphery and face of the cap, said shell holding the recited elements in operative relationship as a unit.

References Cited in the file of this patent

UNITED STATES PATENTS

| | | |
|---|---|---|
| 538,802 | Sullivan | May 7, 1895 |
| 747,447 | Lindenberg | Dec. 22, 1903 |
| 1,248,502 | Kyle | Dec. 4, 1917 |
| 1,338,179 | Hohmeister | Apr. 27, 1920 |
| 1,597,635 | Stickdorn | Aug. 24, 1926 |
| 1,639,997 | Haas | Aug. 23, 1927 |
| 1,641,756 | Haas | Sept. 6, 1927 |
| 1,663,382 | Merkel | Mar. 20, 1928 |
| 1,681,838 | Conklin | Aug. 21, 1928 |
| 1,794,581 | Burdick | Mar. 3, 1931 |
| 1,833,518 | Ericson | Nov. 24, 1931 |
| 1,861,899 | Beach | June 7, 1932 |
| 1,999,904 | Helfrich | Apr. 30, 1935 |
| 2,046,792 | Schmiedeknecht | July 7, 1936 |
| 2,127,892 | Stewart | Aug. 23, 1938 |
| 2,238,146 | Yavitch | Apr. 15, 1941 |
| 2,292,689 | Heare | Aug. 11, 1942 |
| 2,294,785 | Langdon | Sept. 1, 1942 |
| 2,299,706 | Svirsky | Oct. 20, 1942 |
| 2,320,906 | Bent | June 1, 1943 |
| 2,374,989 | Funk | May 1, 1945 |
| 2,395,906 | Owens | Mar. 5, 1946 |
| 2,476,310 | Langdon | July 19, 1949 |
| 2,525,419 | Mellinger | Oct. 10, 1950 |